United States Patent
Binks et al.

[11] 3,794,016
[45] Feb. 26, 1974

[54] STEAM INJECTOR AND SPATULA

[75] Inventors: Chester J. Binks, La Grange; Joseph M. Moser, Des Plaines, both of Ill.

[73] Assignee: Restaurant Technology, Inc., Oak Brook, Ill.

[22] Filed: Apr. 3, 1972

[21] Appl. No.: 240,348

[52] U.S. Cl. ................................. 126/369, 99/243
[51] Int. Cl. ............................................. F24d 1/00
[58] Field of Search.. 126/369, 20; 219/401; 99/243

[56] References Cited
UNITED STATES PATENTS

| | | | |
|---|---|---|---|
| 3,502,065 | 3/1970 | Lassiter | 126/369 X |
| 3,279,450 | 10/1966 | Lassiter | 126/369 X |
| 3,236,172 | 2/1966 | Haedike et al. | 219/401 X |
| 2,973,705 | 3/1961 | Klemm | 126/20 X |
| 2,674,935 | 4/1954 | Lewis et al. | 99/473 |
| 1,460,639 | 7/1923 | Braddick | 126/369 |

*Primary Examiner*—Meyer Perlin
*Assistant Examiner*—William C. Anderson
*Attorney, Agent, or Firm*—Dressler, Goldsmith, Clement & Gordon, Ltd.

[57] ABSTRACT

A steam injector for steaming food products, such as the heels and crowns of buns. The steam injector incorporates a platen covered by a relatively rigid clamping plate enclosing steam forming chambers and passages in the platen, and a relatively flexible, thin cover plate overlying the clamping plate. The clamping and cover plates define orifices through which steam jets upwardly into an overlying steaming chamber. The steaming chamber includes side and back flanges which are integral with the cover plate and is topped by a top plate to define an open front. A juxtaposed removable spatula is formed to provide the front wall of the steaming chamber and to support bun portions to be steamed. The base of the spatula defines steam passages ordered similarly to the steam orifices and provides crowned diffuser members overlying the orifices to baffle and diffuse the steam jetting through the steam passages.

7 Claims, 17 Drawing Figures

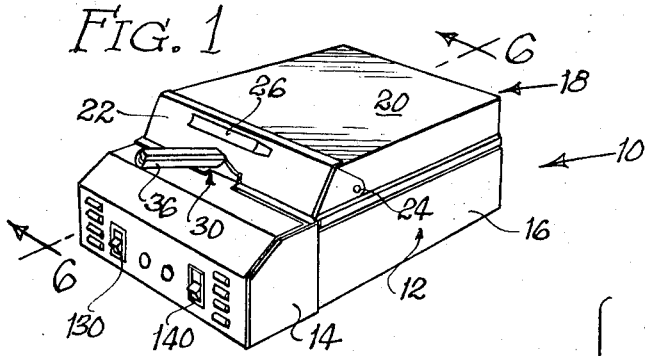
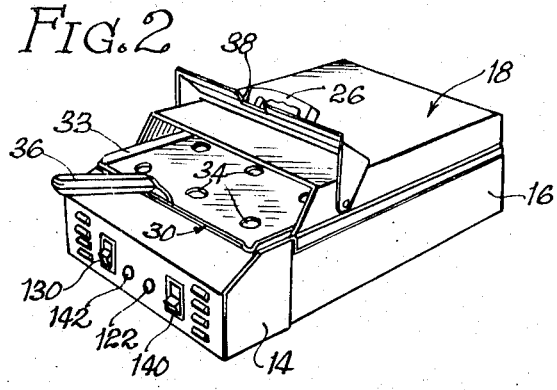
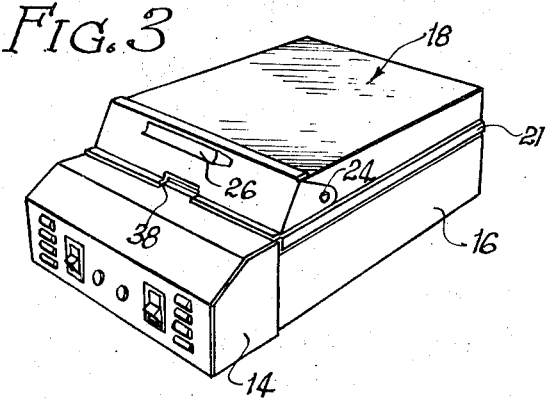
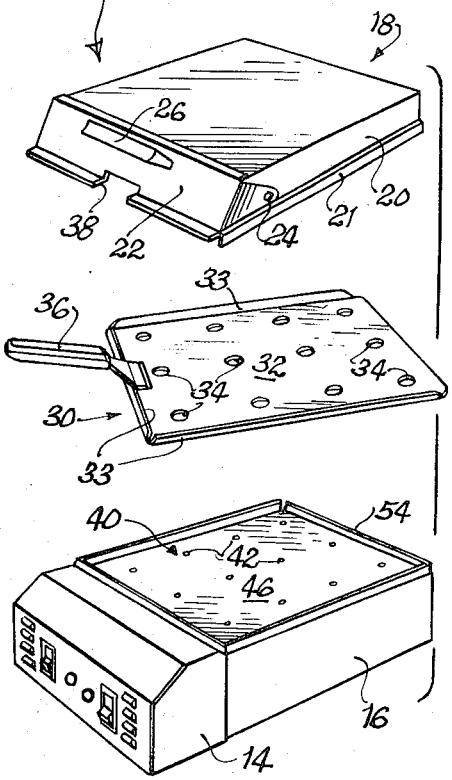
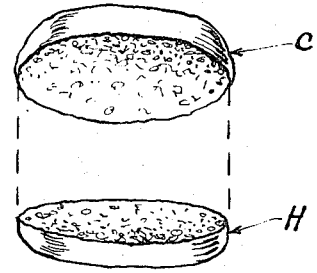

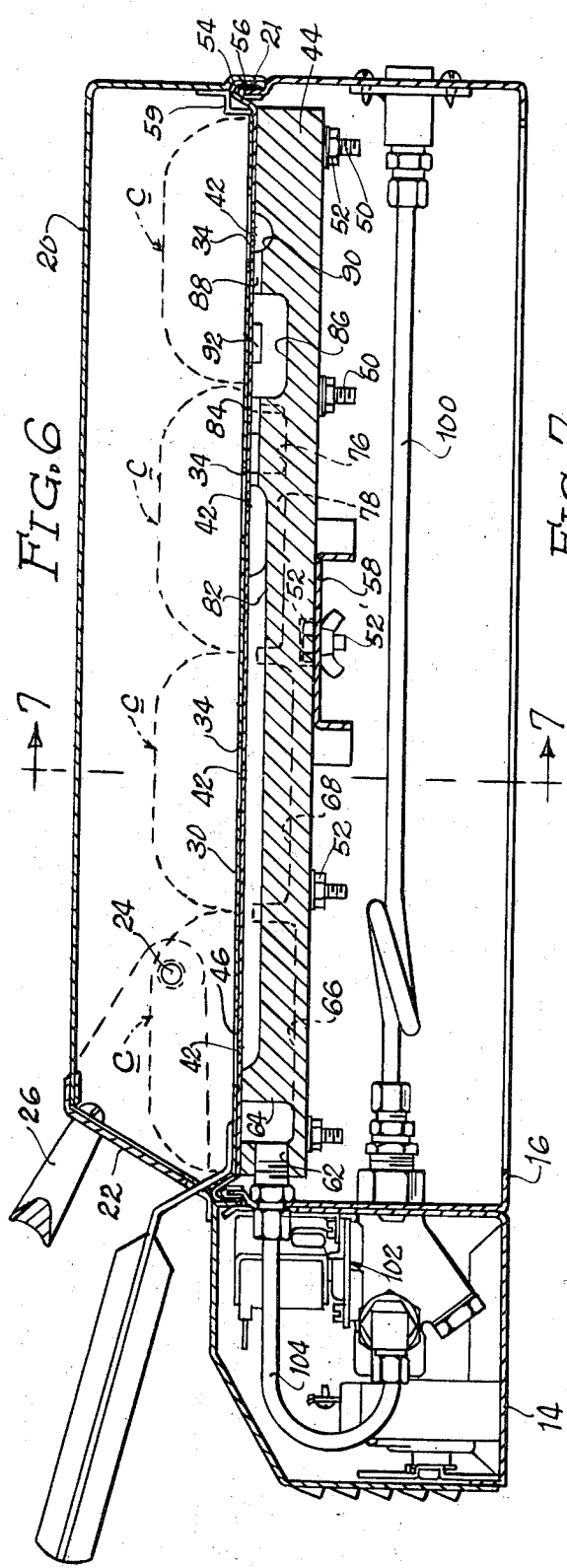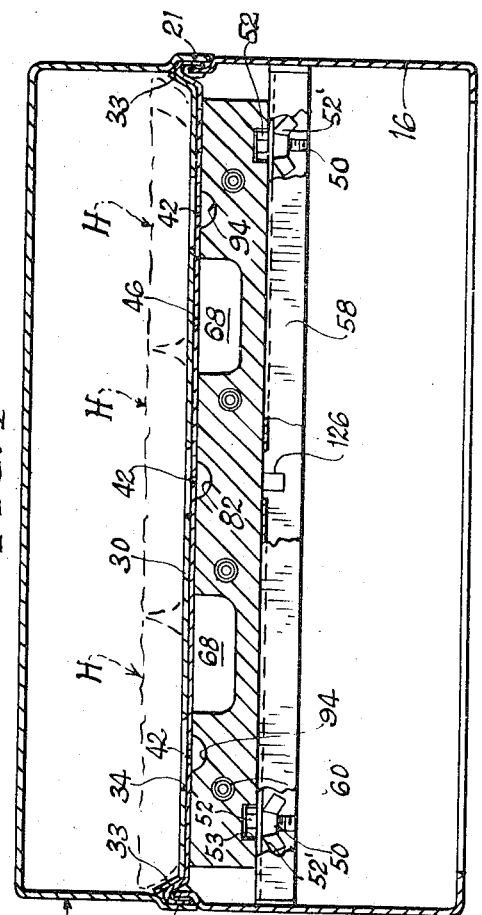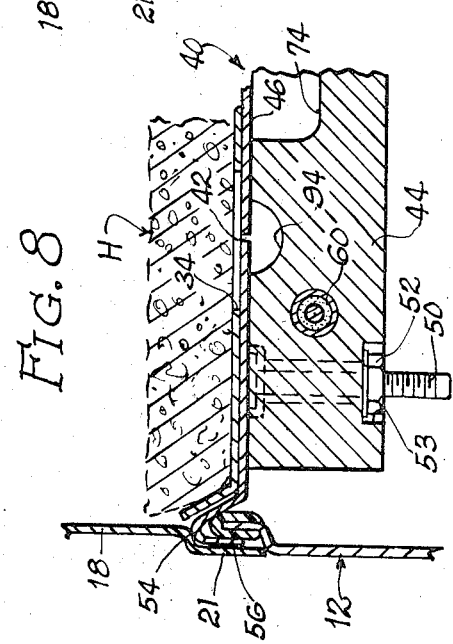

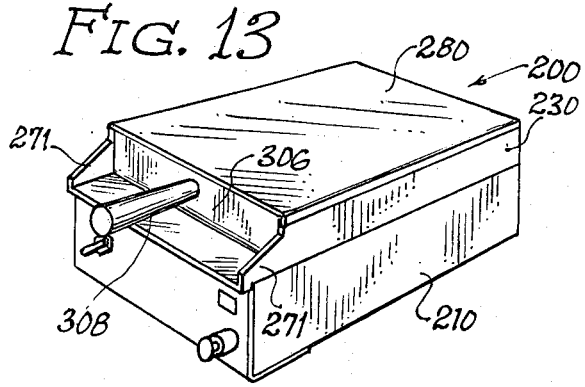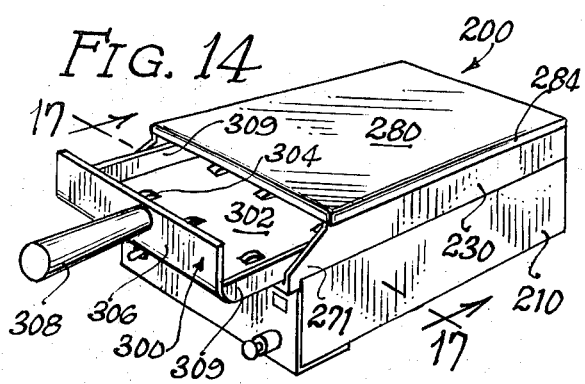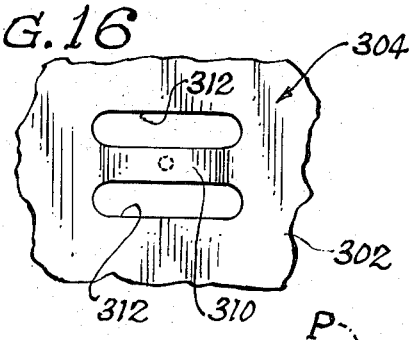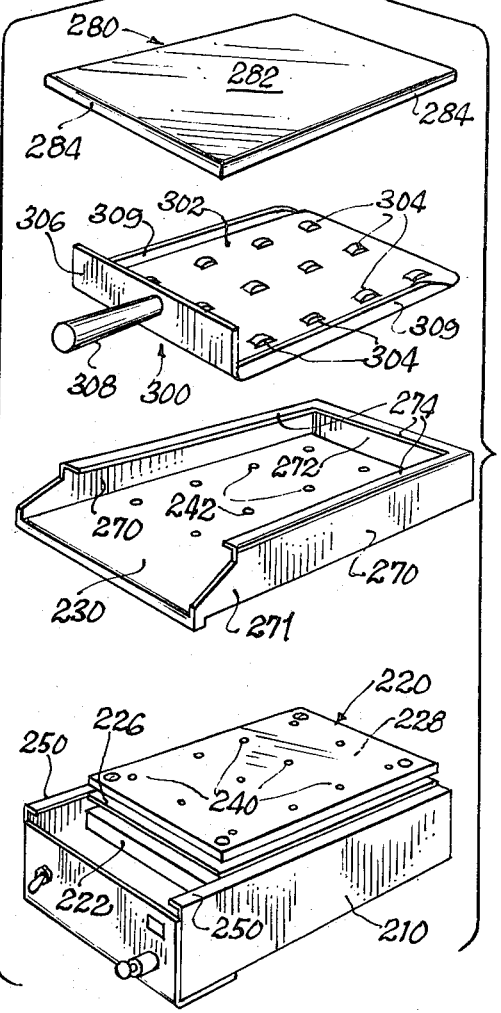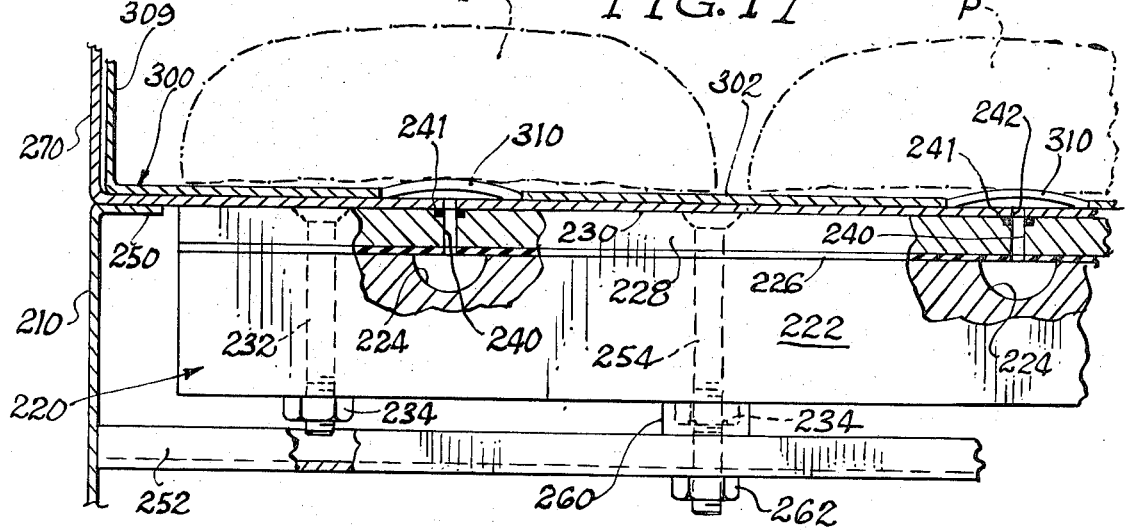

STEAM INJECTOR AND SPATULA

This invention relates to an improved steam injector and to an improved spatula for use therewith.

Flash steamers for steaming food items, such as buns, bread, sandwiches and the like, to maintain those food items at desired levels of moistness and temperature are known. In prior art steamers, a steam chamber is provided into which chamber steam is allowed to pass to provide a steam blanket, from which blanket the food items extract heat and moisture. Steamers of that general type are illustrated in patents such as Haedike et al. U. S. Pat. No. 3,236,172, Lassiter U. S. Pat. No. 3,203,414 and Lewis et al. U. S. Pat. No. 2,674,935.

In copending U. S. Pat. application Ser. No. 86,721 filed on Nov. 4, 1970 and now U.S. Pat. No. 3,735,749, owned by the present assignee, a steam injector which injects uniform quantities of steam directly into each of the individual food items which have been placed and properly located in the steamer was disclosed. It is with an improved steam injector of that character with which the present invention is concerned.

In accordance with the present invention, an improved steam injector for bun portions and the like is provided. The steam injector of this invention may be loaded with one hand easily and rapidly, and steamed foods may be similarly removed. A specially configured spatula is formed to provide one of the walls of a steam chamber associated with the injector, so that when the spatula carrying the food items to be steamed is inserted into the steam chamber, and it is thrust into its fully inserted position, the spatula itself closes the front of the chamber and defines one of the walls of the steam chamber.

The spatula also provides improved means for directing the steam to be injected into the food items it carries. The spatula defines a plurality of steam passages which are ordered and arranged to overlie similarly ordered steam orifices in a platen assembly. The passages each comprise at least a pair of aperture segments between which is positioned a crowned diffuser member which is integral with the base of the spatula. The steam jetting through the steam orifices in the platen assembly first contacts the diffuser member which functions to baffle and to diffuse the steam outwardly to the adjacent aperture segments through which the steam then passes upwardly into the overlying food surface which the passage confronts. Accordingly the steam jet does not impinge directly against the food surface. Further, the crowned disposition of the diffuser member elevates the confronting surface of the food slightly so that the steam is injected into the food over a broader surface. This minimizes the possibility of adversely affecting the food at the area where the steam is injected.

The bun steam injector of this invention also incorporates an improved platen assembly. The platen assembly includes a platen member which defines a plurality of chambers and passages at its upper face. These are covered and enclosed by a clamping plate which is relatively rigid and relatively thick, to define, between it and the platen assembly, steam generating chambers and steam discharge passages. A relatively thin cover plate overlies the clamping plate. The clamping plate and cover plate define appropriately ordered and aligned orifices which overlie the steam discharge passages in the platen member so that steam jets may issue from those passages upwardly through the orifices.

Preferably, the steam chamber into which a spatula carrying suitably ordered food items is inserted includes the cover plate. The cover may be formed with upstanding flanges at the sides and back. At their upper edges, the flanges are formed to cooperate with an appropriately configured top plate. The top plate may be seated upon the upper edges of the flanges. Together, these define a chamber which is open at its front and which is adapted to be closed by a spatula of this invention when it is appropriately juxtaposed with the steam injector.

Further objects, features and advantages of this invention will become apparent from the following description and drawings, of which:

FIG. 1 is a perspective view of a bun steam injector in accordance with the aforementioned application;

FIG. 2 is a view similar to that of FIG. 1 showing the cover assembly in an open position;

FIG. 3 is a view similar to that of FIG. 1 absent a bun tray;

FIG. 4 is an exploded perspective view of FIG. 1;

FIG. 5 is a view of sandwich bun portions adapted to be steamed;

FIG. 6 is a cross-sectional view taken substantially along the line 6—6 of FIG. 1, FIG. 9 further illustrating where the section of FIG. 6 has been taken;

FIG. 7 is a cross-sectional view taken substantially along the line 7—7 of FIG. 6;

FIG. 8 is an enlarged fragmentary sectional view of a portion of FIG. 7;

FIG. 13 is a bun steam injector of this invention;

FIG. 14 is a view similar to FIG. 13 with the spatula in a partially withdrawn position;

FIG. 15 is an exploded perspective view of FIG. 1;

FIG. 16 is an enlarged fragmentary view of a portion of a spatula; and

FIG. 17 is an enlarged fragmentary view taken substantially along the line 17—17 of FIG. 14.

Figures 9, 10:
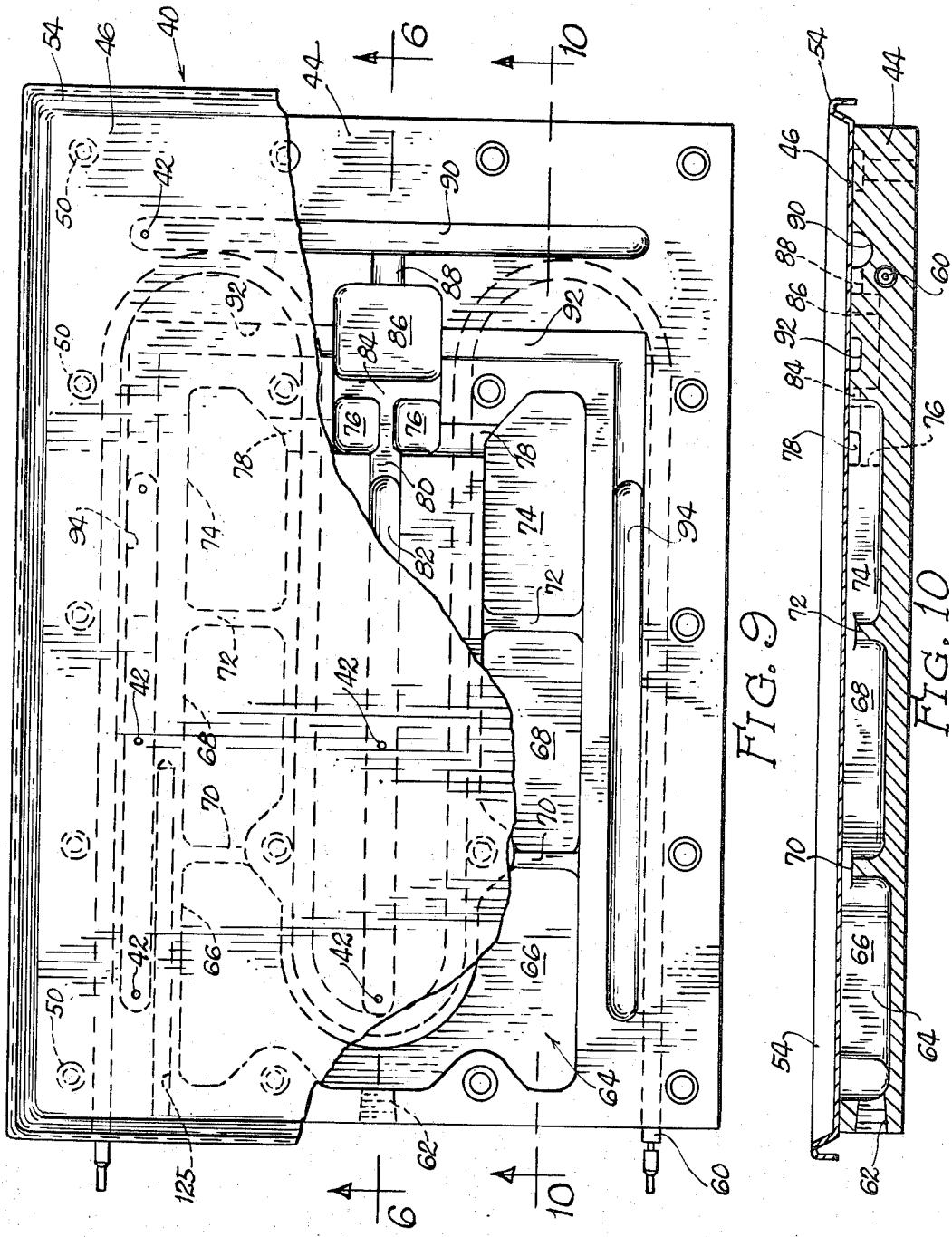
FIG. 9 is a plan view, partially broken away, of the platen assembly of the bun steam injector of FIG. 1.
FIG. 10 is a cross-sectional view taken substantially along the line 10—10 of FIG. 9.

FIGS. 1 to 12 illustrate a bun steam injector 10 as described and illustrated in said U.S. application Ser. No. 86,721. Injector 10 comprises a cabinet assembly 12 having a control cabinet portion 14 and a base cabinet portion 16. A cover assembly 18 is supported on the base cabinet portion 16 and comprises a cover portion 20 to which a front 22 is hingedly connected for movement about hinge pins 24 by handle 26.

Bun crown portions C and bun heel portions H (FIG. 5) are insertable into injector 10 on a perforated tray 30. Tray 30 comprises an expansive base 32 perforated with twelve regularly and equidistantly spaced perforations 34. The front and side edges of base 32 are integrally formed with a lip 33 to prevent movement of the bun portions. A handle 36 is secured to base 32. Front 22 is notched at 38 to accommodate the handle.

The base portion 16 supports a platen assembly 40 which defines a plurality of steam injection orifices 42 through which steam is injected upwardly through the perforations 34. Orifices 42 are regularly and equidistantly spaced and are in rows and columns ordered to inject similarly ordered overlying bun portions with steam through similarly ordered perforations 34.

Platen assembly 40 comprises a suitably configured platen 44 overlaid by a platen pan 46 which defines orifices 42. Pan 46 is sealingly secured to platen 44 by a plurality of studs 50, the heads of which are connected, as by welding, to platen pan 46. Nuts 52 sealingly clamp the lower surface of the platen pan 46 to the upper surface of platen 44. A sealing material, such as a silicon rubber is interposed between the pan 46 and the platen 44 at their contacting edge surfaces.

Figure 12:
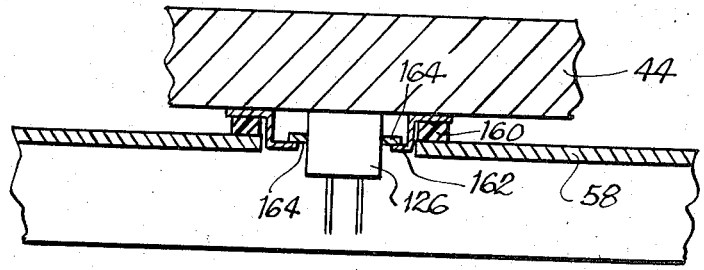
FIG. 12 is an enlarged fragmentary section of FIG. 7.

The platen assembly is marginally supported on cabinet portion 16. Platen pan 46 defines a channel portion 54 seated on the upper edge 56 of the sheet metal defining the base cabinet portion 16. Channel 58, extending between opposite sides of cabinet portion 16, is proportioned to supportingly underlie platen assembly 40 centrally thereof. Two studs 50 project through channel 58 and mount nuts 52 in counterbores 53 to secure the platen pan to the platen (see FIGS. 7 and 8). Wing nuts 52' releasably secure the platen assembly to channel 58, hence to the cabinet, and, as will appear, also serve to urge thermostat 126 into contact with the platen 44 (FIG. 12).

Cover assembly 18 is seated on the upper edge of channel portion 54 (see FIGS. 6 and 7). Accidental rearward movement of assembly 18 is prevented by a pair of spaced bracket elements 59 which, with the confronting lower peripheral edge of cover portion 20, nestingly receives channel portion 54 (see FIG. 6). The lower edges 21 of cover portion 20 are slightly offset. Thus, bracket elements 59 and edge 21 cooperate with channel portion 54 to provide a hinge to allow cover 20 to be pivoted about channel portion 54. Channel portions 54, at the sides, and bracket elements 59, at the rear, serve to locate the tray, and tray perforations 34 in alignment with orifices 42.

Platen 44 is preferably cast of an aluminum alloy, such as No. 319 aluminum alloy. It is cast with a resistance heating means to be embedded therein, such as a looped resistance element 60, and with upwardly facing channels and chambers, all located, proportioned and configured to assure the injection of dry steam only through injection orifices 42.

A predetermined amount of water is supplied to the platen assembly 40 through a water inlet 62 tapped to receive a male fitting (see FIG. 6) for each cycle of operation. The water passes directly into a first vaporizing or steam generating chamber 64 having two spaced apart lobes 66. Water and steam then pass rearwardly from lobes 66 into shallower second steam generating chambers 68. Chambers 64 and 68 are separated by baffle walls 70. The steam generated in chambers 64 and 68 and any entrained water then passes over second baffle walls 72 into still shallower third steam generating chambers 74 from which the steam and any entrained water passes into steam chambers 76 through yet shallower passageways 78. By this time, all of the water will have been converted into high quality superheated steam which then passes from chambers 76 in several directions. Some passes forwardly along restrictive steam passage 80 into a semi-cylindrical steam injection channel 82. Another portion of the steam passes across restrictive baffle section 84 into steam chamber 86. Chambers 76 and 86 are no deeper than the steam generating chambers 64, 66 and 74 and are of a lesser volume. From steam chamber 86 steam passes through restrictive steam passage 88 into semi-cylindrical steam injection channel 90, and also passes from chamber 86 over right-angled shallow restrictive steam passages 92 into semi-cylindrical steam injection channels 94. Each of the steam injection channels is of a substantially greater cross-sectional area than the restrictive steam passages.

The peripheries of steam injection channels 82, 90 and 94 sealingly bear against the lower surface of platen pan 46 thereby to allow the escape of steam only through the overlying steam orifices 42.

The steam issuing from steam orifices 42, because of the chamber and channel array, is of a very high quality, i.e., very dry steam. That array provides baffling, provides for the repeated expansion and compression of the generated steam and provides for repeated changes in velocity, all of which contributes to the generation of high quality steam. That array also enhances contact with the hot metal platen assembly surfaces and eliminates entrained water by the time the steam reaches the steam injection channels.

Figure 11:
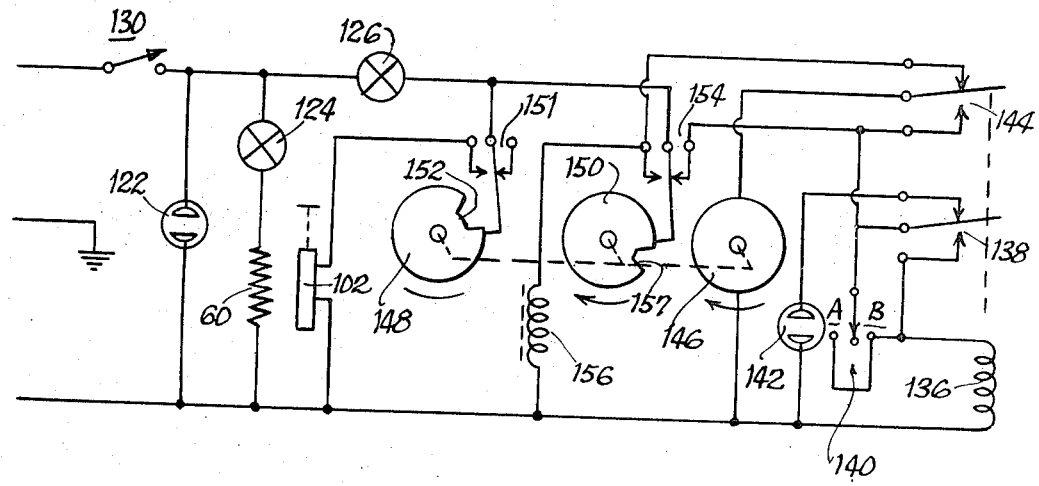
FIG. 11 is a circuit diagram of the bun steam injector of FIG. 1.

Referring now to FIGS. 6 and 11, water is supplied to tapped water inlet 62 via a water supply line 100 controlled by a solenoid operated, pressure regulating uniform flow control valve assembly 102. Valve assembly 102 is adapted to provide a uniform rate of flow of water regardless of noral variations in line pressure. Water discharging through the valve assembly 102 enters the tapped water inlet 62 through a feed line 104.

As illustrated by FIGS. 7 and 12, wing nuts 52' not only secure the platen assembly, but also bias platen assembly 40 toward channel 58 thereby to urge the sensing head of a thermostat 126 against platen 44 through resilient gasket 160 and dished washer 162, which in turn bear against bayonet arms 164 secured to the thermostat. This mounting for the thermostat also provides for its separate and easy removal when necessary. When wing nuts 52' are removed and the thermostat 124 is removed, and the water connection and the resistance heater connections are broken, the platen assembly 40 may be lifted out of the cabinet for repair or cleaning.

The circuit for injector 10 is powered from a standard 120 volt alternating current source through a conventional on/off switch 130 associated with a neon indicator lamp 122. The temperature at which resistance element 60 is operated is controlled by a thermostat 124, the sensing portion of which is proportioned to be inserted in a thermostat bore 125 (FIG. 9) in platen 44.

The injection of the water into the platen assembly is controlled to take place only above a predetermined minimum elevated temperature, such as 250° F., and is controlled by the thermostat 126 secured at the base of platen 44. The predetermined minimum temperature is indicated by a neon lamp 142 which is illuminated when the temperature of the platen exceeds the predetermined minimum.

When thermostat 126 indicates that the predetermined platen temperature has been reached or exceeded, i.e., is at a temperature at which high quality steam will be generated, the closing of a two position start switch 140 will cause a predetermined amount of water to be injected through inlet 62.

Switch 140 has a non-operational center position and is adapted to be moved to a manual position A or to an automatic position B. In position A the contacts will be momentarily closed only, thereby to energize relay 136 which will open switch 138 to extinguish neon lamp 142 (to indicate a steam injecting cycle is in progress) and which will close switch 144 to energize timer motor 146. When automatic position B is selected the contacts of switches 138 and 144 will remain closed, continuously energizing motor 146 and maintaining lamp 142 in an extinguished condition.

The shaft of timer motor 146 mounts a pair of cams 148 and 150. Cam 148 is configured to open the solenoid operated valve assembly 102 to allow a preselected amount of water to pass into inlet 62. When cam 148 has moved clockwise to the cam area 152 it acts upon a switch 151 to open valve assembly 102. Cam 150 acts upon a switch 154 to maintain power to timer motor 146 through the contacts of closed switch 144. This is accomplished for almost a complete revolution of the timer motor, except for the cam notch 157 at the very end. In that cam notch, switch 154 breaks contacts to switches 138 and 144, de-energizing relay 136 and breaking power to timer motor 146. However, also in that cam notch, switch 154 makes another contact which, through contacts of switch 144, energizes timer motor 146 until cam 150 continues past cam notch 157 and stops. During this momentary resetting. cam notch 157, through switch 154, will energize an alarm such as a buzzer 156 which will signal the completion of a steam injecting cycle.

When the switch 140 is in automatic (or continuous) position B, the signaling will be discontinued when cam 150 moves past its cam notch. In this position a predetermined number of steam injection cycles may be obtained by controlling the timer motor 146. This is of advantage where bun portions are to be held for longer than a single cycle to make certain that suitable moisture and temperature levels are achieved and maintained.

To utilize injector 10, a plurality of bun portions are placed in regularly and equidistantly ordered rows and columns over similarly ordered steam injection orifices, through an intermediate tray perforated with similarly ordered perforations which are larger than the steam injection orifices. Superheated steam is then generated and is injected upwardly directly into the bun portions in the manner described.

FIGS. 13 to 17 illustrate an improved bun steam injector 200 which embodies the basic principles and mode of operation of bun steam injector 10. Injector 200 improves upon injector 10 in a number of important respects, both in terms of its construction, and in terms of its ease and effectiveness of use. Except as otherwise indicated, however, a preferred embodiment of bun steam injector 200, its electrical circuitry and its mechanical construction may be in conformity with those of injector 10, and its mode of operation may be in conformity with the mode of operation of that of injector 10.

Bun steam injector 200 comprises a cabinet including a cabinet base section 210. Base section 210 is fabricated of sheet metal and is proportioned to house the control circuitry and the water supply lines, and to support a platen assembly 220 and an upper cabinet section.

Platen assembly 220 comprises a platen element 222, the chambering of which may be substantially indentical to that of platen 44. Platen element 222 defines semi-cylindrical steam injection channels 224 through which dry steam may discharge upwardly through the remainder of the platen assembly, and into bun portions to be steamed.

Platen assembly 220 further comprises a sealing gasket 226, a clamping plate 228 and a cover plate 230. Plates 228 and 230 are sealingly secured to the platen element 222, as by a series of appropriately spaced studs 232. Studs 232 are connected, as by welding, to the lower surface of cover plate 230 and project downwardly through complementary bores in clamping plate 228, in sealing gasket 226 and in platen element 222. The lower ends of the studs threadingly receive nuts 234 which are torqued sufficiently to effect a seal between the clamping plate 228 and the platen element 222 adjacent all of the land areas of the platen element. Accordingly, steam generated in the chamber and channel areas of platen element 222 will escape only through channels 224 and upwardly through the overlying steam discharge orifices 240 in plate 228 (as well as through the aligned orifices in gasket 226). O-rings 241 are seated in appropriate recesses in clamping plate 228 to insure a seal between plates 228 and 230 adjacent orifices 240.

The orifices in clamping plate 228 are equidistantly and uniformly spaced and ordered (see FIG. 15) to concide with complementary overlying orifices 242 in cover plate 230 and to coincide, thereby, with food product portions, such as bun portions P, which are preferably to be disposed in regular rows and columns to be steamed.

The platen assembly 220 is adapted to be supported on base section 210. Referring now to FIG. 17, base section 210 defines supporting flange elements 250 which are positioned at two sides and at the rear of the section 210. Further, base section 210 provides one or two support members or channels 252 which extend between the sides of the section 210 and which are secured, as by welding, at each side. The elevations of channels 252 and of flange elements 250 are such that when the platen assembly is bolted to the channels, the peripheral edges of the cover plate 230 will be tightly held against flange elements 250.

Each channel 252 defines suitably spaced apertures to receive at least a pair of studs 254. Those studs, like studs 232, act to secure the platen assembly members to each other and also to mount the platen assembly to base section 210. A spacing washer 260 is provided to surround each nut 234 on a stud 254. Washers 260 appropriately space support channels 252 and the lower surfaces of the platen element 222. Nuts 262 draw the platen assemhly 220 toward the support channels 252, thereby releasably to secure the platen assembly to the cabinet base section 210.

Cover plate 230 is desirably formed integrally with a series of flange elements which cooperate to define a portion of the steam chamber of this invention. Accordingly, vertical side flange elements 270 and a rear flange element 272 are provided, and together with cover plate 230, define an open topped, open front cabinet section. Side elements 270 terminate forwardly in spatula guide segments 271. Each flange element 270 and 272 desirably provides an integral horizontal flange segment 274 to cooperate in supporting a chamber cover 280.

Removable chamber cover 280, as seen in FIG. 14, overlies cover plate 230 and its associated flange elements and segments and cooperates with the upper reaches of that assembly to provide a chamber which is enclosed except at its front, and a chamber which is easily opened and readily accessible for cleaning and the like. Chamber cover 280 preferably comprises a planar major cover element 282 which terminates peripherally in flanges 284 for nestingly receiving the upper reaches of the cover plate flanges.

The steam chamber is adapted to be closed by a spatula member of this invention, thereby eliminating the need for separate hinged front panels and the like, thereby adapting the bun steam injector 200 for one-handed use. Spatula 300 comprises an expansive planar base 302 which defines a plurality of regularly and equidistantly spaced and ordered steam diffusion passages 304 which may conveniently be twelve in number. Steam diffusion passages 304 are spaced to coincide with the spacing of orifices 242. Base 302 is integrally formed with a chamber closure section 306 which mounts a suitable handle 308. Side lips 309 assist in preventing unwanted movement of bun portions.

Even though the bun steam injector 10 substantially improved upon the quality of bun portions and the like requiring moistening, as compared to what the prior art made available, it was found that the injection of steam, as through perforations 34 sometimes resulted in a localized undesirable surface effect on the bun portions. That effect is eliminated by the specially designed steam diffusion passages 304 formed in base 302. Accordingly, each steam diffusion passage 304 preferably comprises an aperture, when viewed from the bottom, which is bridged centrally thereof by a crowned elongate diffuser member 310. When viewed from the top of base 302, the passages 304 each appear to comprise a pair of aperture sections 312 spaced by diffuser member 310. Because diffuser members 310 are generally crowned and are formed slightly out of the plane of the base 302, they slightly elevate a central region of an overlying food portion.

The diffuser members serve at least two important functions. First of all, steam issuing from an orifice 242 first strikes a diffuser member 310 causing some diffusion of the jet-like stream. Although the steam still tends to move upwardly through aperture sections 312, its movement is at a reduced velocity and over a somewhat greater area making certain the fact that the steam is more evenly distributed throughout the overlying bun portion, aand with a minimum of adverse skin effect at the surface of the bun portion overlying an orifice 242. Secondly, the slight crown of diffuser member 310 allows the steam to diffuse even more distantly from passage 304, so that the steam will enter the bun in a somewhat wider area around passage 304. The crown is insufficient to permit the steam to diffuse broadly enough to disperse it throughout the chamber, but the crown is sufficient to enhance the moisturizing effect of the steam for the buns.

When the steam injector 200 is to be used, having first been assembled as illustrated in FIGS. 13 and 14, a spatula member 300 is supplied with a desired number of bun portions P, each one overlying a single steam diffusion passage 304. The spatula is then brought to the steam injector, is positioned between guide segments 271 and on base 230, and is thrust through the open front of the chamber gradually to the position of FIG. 14 and finally home to the position of FIG. 13. At that time, the closure section 306 completes the enclosure of the steam chamber. The side edges of the section 306 preferably snugly fit against guide segments 271 to minimize the escape of steam from the steam chamber when it is in use. Further, because the chamber and spatula are matingly configured, when the spatula is thrust home, it is guided into a position by the chamber in which the passages 304 overlie the orifices 242.

At that time, a steam injection cycle, as described above in connection with FIGS. 1 to 12 may be commenced. It has been determined that an automatic cycle of steam injection comprising serial injection of about 30 cc. of water into the platen assembly at three intervals, at 5 seconds, at 25 seconds and at 60 seconds, with a total steam and holding time of about 90 seconds, produces buns of a superior quality.

It has also been determined that the steam chamber formed as described is sufficiently enclosed to serve as a suitable enclosure for the steaming operation, and to hold the buns as steamed without deleterious exposure to the ambient atmosphere. Indeed in the steam chamber as described buns can be held without drying out for a longer period of time than was possible in prior art steamers.

The bun steam injector of FIGS. 1 to 12 was found to steam buns to highly desirable temperature and moisture levels and to produce steamed and moistened buns superior to those obtained in conventional steamers, such as those disclosed in the patents referred to above, and in a much more convenient manner.

The bun steam injector of FIGS. 13 to 17 has been found to improve substantially upon the injector of FIGS. 1 to 12, particularly in the ease of utilization of the improved steam chamber, in the improved service life of the platen assembly and in the improved diffusion of the steam in the buns and without any undesirable skin effect. Further, the rigidity of the steam chamber assembly is improved over the injector of FIGS. 1 to 12. Steam leakage is reduced as compared to the injector of FIGS. 1 to 12 and the cover is more positively retained than was the cover of FIGS. 1 to 12. The assembly also minimizes the number of exposed dirt catching seams to improve the sanitary characteristics of the injector.

The foregoing description and drawings will suggest modifications to those skilled in the art. Accordingly, the invention is intended to be limited only in accordance with the claims, and not by the particular embodiment of the invention herein disclosed.

What is claimed is:

1. A steam injector comprising a heated platen assembly and a cabinet section, said platen assembly being supported on said cabinet section and being releasably secured to said cabinet section for ready removability, said platen assembly providing a water inlet communicating with steam generating chambers and steam discharge passages defined by said platen assembly, said platen assembly comprising a platen and a platen cover plate, said platen cover plate defining steam discharge orifices in communication with said steam discharge passages, and a steam chamber, said steam chamber comprising said platen cover plate, side walls, a back wall and a top plate spaced from said cover plate and providing an open front, a spatula, said spatula defining an expansive surface defining a plurality of passages aligned with said orifices and said spatula providing a large front wall for closing said open front thereby to form an enclosed steam chamber.

2. A steam injector in accordance with claim 1 wherein said side walls, back wall and platen cover plate are integrally formed, and said top plate is removably supported on said side walls and back wall.

3. A steam injector in accordance with claim 1 wherein said spatula front wall mounts a handle.

4. A steam injector in accordance with claim 1 wherein said spatula passages are arranged in rows and columns and each defines at least two passage segments spaced by a diffuser member positioned to overlie an orifice to diffuse steam discharging through said orifice.

5. A steam injector comprising a heated platen assembly and a cabinet section, said platen assembly being supported on said cabinet section and being releasably secured thereto for ready removability, said platen assembly comprising a platen defining steam generating and steam discharge passages in one of its faces, and an expansive, relatively thick, rigid clamping plate confront-ing said platen and overlying said passages to form closed passages, said clamping plate defining a plurality of regularly ordered and spaced steam discharge orifices overlying said steam discharge passages, a steam chamber for receiving food products to be steamed, the base of said steam chamber comprising a relatively thin sheet metal cover plate confronting said clamping plate and defining orifices aligned with said steam discharge orifices, and means for securing said platen, said clamping plate and said cover plate to each other and for securing said platen assembly to said cabinet section, said steam chamber further comprising side walls, a back wall and a top plate, and defining an open front, and a spatula, said spatula having an expansive surface defining a plurality of passages aligned with said orifices, and a large front wall for closing said open front thereby to form an enclosed steam chamber.

6. A steam injector in accordance with claim 5 wherein said spatula passages are arranged in rows and columns and each defines at least two passage segments spaced by a diffuser member positioned to overlie an orifice to diffuse steam discharging through said orifice.

7. A steam injector comprising a heated platen assembly and a cabinet section, said platen assembly being supported on said cabinet section and being releasably secured thereto for ready removability, said platen assembly comprising a platen defining steam generating and steam discharge passages in one of its faces, and an expansive, relatively thick, rigid clamping plate confronting said platen and overlying said passages to form closed passages, said clamping plate defining a plurality of regularly ordered and spaced steam discharge orifices overlying said steam discharge passages, a steam chamber for receiving food products to be steamed, the base of said steam chamber comprising a relatively thin sheet metal cover plate confronting said clamping plate and defining orifices aligned with said steam discharge orifices, and means for securing said platen, said clamping plate and said cover plate to each other and for securing said platen assembly to said cabinet section, said steam chamber further comprising side walls, a back wall and a top plate, and defining an open front, and wherein said side walls, back wall and platen cover plate are integrally formed, and said top plate is removably supported on said side walls and back wall.

* * * * *